United States Patent [19]

Truxa et al.

[11] 3,760,685

[45] Sept. 25, 1973

[54] ADJUSTABLE PROFILE CUTTER MEANS

[75] Inventors: Leslie Truxa, Montreal; J. Gilbert Descary, Lachine, Quebec, both of Canada

[73] Assignee: Dominion Engineering Works, Limited, Lachine, Quebec, Canada

[22] Filed: Nov. 3, 1971

[21] Appl. No.: 195,217

Related U.S. Application Data

[63] Continuation of Ser. No. 9,592, Feb. 9, 1970, abandoned.

[52] U.S. Cl. .................... 90/15, 90/17, 29/103 A, 144/134 A
[51] Int. Cl. .............................. B23c 1/12
[58] Field of Search ............... 90/15, 17, 24 R, 90/38 R, 41, 34, 35, 19, DIG. 2; 29/103 R, 103 A, 105 R; 144/134 A

[56] References Cited
UNITED STATES PATENTS

| 3,640,182 | 2/1972 | Vertin | 90/17 X |
| 1,004,620 | 10/1911 | Berold | 90/17 |
| 301,775 | 7/1884 | Thompson | 144/134 R |

*Primary Examiner*—Gil Weidenfeld
*Attorney*—Raymond A. Eckersley et al.

[57] ABSTRACT

The surface of a plastic foil used for extracting water from the forming wire of a paper making machine is formed or reconditioned by a profile cutter traversing the length of the foil, to provide a capability for correct foil profiling from standard stock and reconditioning or adjustment to foils, even at the mill.

2 Claims, 2 Drawing Figures

INVENTORS
LESLIE TRUXA
GILBERT J. DESCARY
BY
R.O. Eckersley
PATENT AGENT

ADJUSTABLE PROFILE CUTTER MEANS

This application is a continuation of Application Ser. No. 9,592, filed Feb. 9, 1970 now abandoned.

This invention is directed to a system for preparing water extraction foils used in paper making machines, and in particular to a system for conditioning plastic surfaced foils at the mill.

In the pulp and paper industry the use of water extraction foils to extract liquid outwardly through the travelling wire of a Fourdrinier or like web forming surface is becoming more and more widespread.

The adoption of low cost types of foil using plastic materials for the foil wearing surfaces has been hindered by the high wear rate of such foils from the passage thereover of the travelling wire. In order to make satisfactory use of water extraction foils it is necessary to ensure precise dimensional control of the foils, for reliable operation, and in the absence of a suitable in-plant foil conditioning system, the adoption of plastic faced foils has previsouly been limited owing to the frequent need to return worn foils to the manufacturer for reconditioning.

The present invention provides a foil conditioning system suitable for use in a paper or board mill, so that machining of precise foil surfaces can be effected without having recourse to the foil manufacturer.

In addition to use with worn foils, the system has further unobvious advantages in that the range of foil types carried as spare parts in a mill can be restricted, as the foil angle can be varied by the relatively simple expedient of machining the desired drainage angle of declination on to a standard foil profile.

The upper surfaces of a foil generally comprise a leading flat surface and a downwardly inclined trailing surface considered in relation to a Fourdrinier wire passing over the foil. The angle of declination usually varies in the range from a half degree to five degrees, considered in relation to the plane of motion of a Fourdrinier wire.

The provision of a system capable of surfacing or resurfacing a foil to any desired angle within this range permits the number of spare foils carried in the mill to be minimized, with consequent saving in inventory costs.

The term foil as used herein will be understood to apply to foils, deflectors and suction box covers where made of plastic or like material suitable for machining by the subject system.

The profiling cutter used in the subject system, comprises one or more heavily raked or relieved fly cutter blades, extending radially from a rigid arbor or rotating head.

In the operation of the cutter, with the axis of rotation of the cutter located parallel with the foil top surface to be cut, and extending normal to the main axis of the foil and normal to the path of advance of the cutter along the foil, then the foil angle of declination generated by an inclined flank portion of the cutter blade will be the same as the actual divergence angle between the cutter blade portions. However, by skewing the axis of rotation of the cutter relative to the path of advance the angle of declination cut into the foil will be greater than the actual related blade angle. Thus a single method of precise machining control of the effective foil angle of declination is provided, by skewing the related decline portion of the cutter blade relative to the cutter path of advance, as compared with two other alternatives, of either providing a very large number of cutter blades covering a range of differing related angles, or separately machining the foil top surface after cutting the foil flank or decline portion by directly inclining the axis of rotation of the cutter relative, to the decline surface to be generated, and normal to the axis of advance.

These alternative methods of angle control are clearly more limited than the present arrangement, in requiring a greater number of alternative cutters in the first instance, or in the second instance requiring extremely precise direct adjustment of the blade declination angle, which is generally difficult to obtain, particularly if using semi-skilled labour. The advantage of obtaining foil profiling in a single pass will also be self evident, in the savings in set-up time particularly where a gang of foils from a suction box require to be sequentially surfaced, to precisely the same declination.

Surface conditioning apparatus for simultaneously machining two adjacent mutually inclined surfaces of a slender water extraction foil having a high ratio of foil length relative to the transverse widths of the surfaces, comprising; surface cutting means to simultaneously generate the two inclined surfaces, having a rotatable cutter head with at least one cutter blade projecting therefrom; driving means to rotatably drive the surface cutting means in surface generating operation; adjustable mounting means securing the cutting means in adjustable relation with the two adjacent surfaces to permit adjustment in the cut effected therewith; and feed means to provide relative longitudinal travel between the cutting means and the two surfaces, in a direction parallel with the foil longitudinal axis and the line of intersection of the two surfaces.

It will be appreciated that the angle at which the cutter axis is inclined to the foil longitudinal axis may well be and usually is substantially a right angle.

Certain embodiments of the present invention are described, reference being made to the accompanying drawings, wherein.

Figure 1:
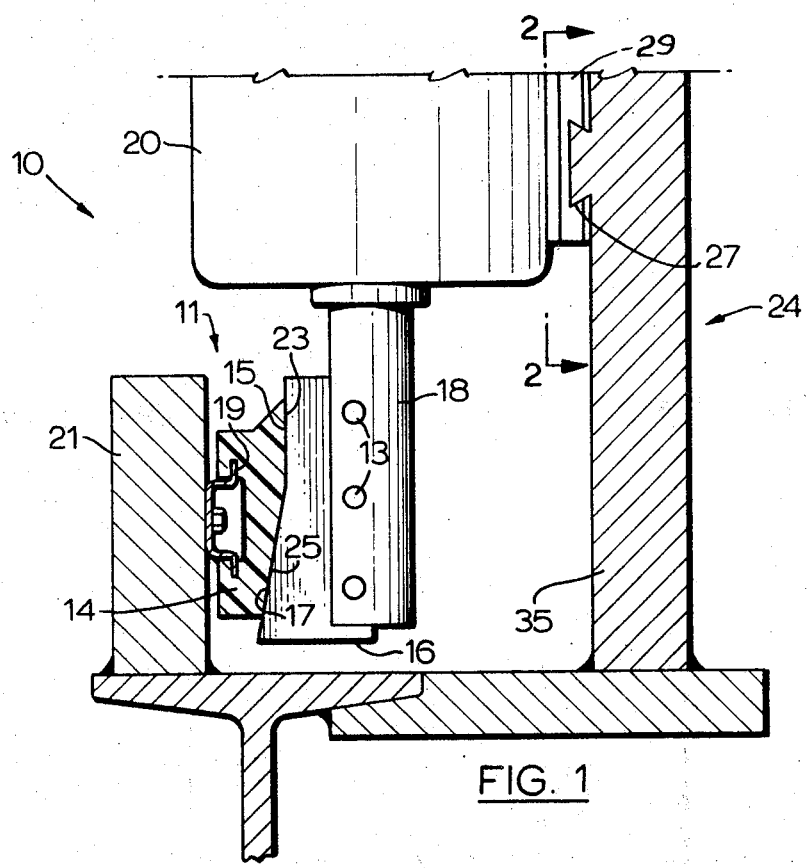
FIG. 1 is a partly sectioned end view showing the apparatus of the system.
Figure 2:
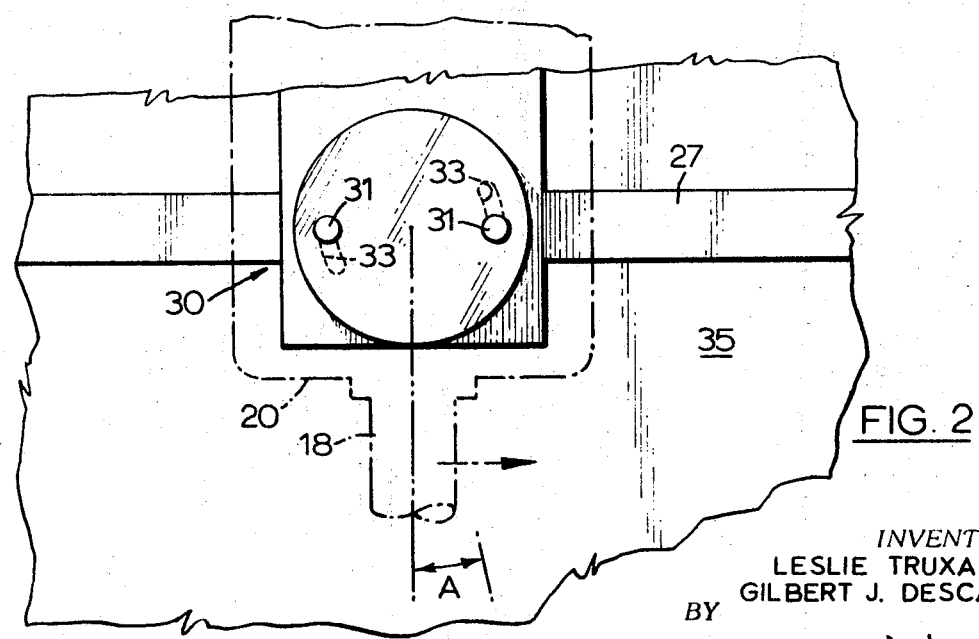
FIG. 2 is a part elevational view at 2—2 of FIG. 1.

Referring first to FIG. 1, the surface conditioning apparatus 10 comprises a foil locating fixture 11, having a foil 14 mounted in a vertically oriented position thereon, and a surface conditioning cutter 16 rotatably carried on the head or shaft 18 and driven by motor 20. The motor 20 is carried by support structure 24.

In the illustrated embodiment the foil 14, having a top operating face 15 and a drainage inducing or decline surface 17 is slidably mounted on a so-called top-hat section 19 attached as by bolting to a rigid support member 21, being arranged in a non-operative vertical position.

The cutter blade 14 has a front edge portion 23 for facing the foil top surface 15, and a decline edge portion 25 inclined from the portion 23 by a selected angle generally in the range of half a degree to 5°.

The cutter blade 16 is shown bolted to the slotted head 18, by machine screws 13, to permit of radial and axial positioning relative to the axis of rotation of the head 18.

The motor support structure 24, shown rigidly secured to the foil support structure 11, includes a plate 35 with a longitudinally extending rib 27 of dovetail section having a slide plate 29 slidably mounted thereon for translational sliding movement along the rib 27 in a direction parallel with the longitudinal axis of the foil 14 and the foil surfaces 15, 17. The motor 20 is secured to an adjustable swivel fixture 30 attached to the slide plate 29 by machine screws 31 located in arcuate slots 33. Adjustment of the swivel fixture 30 provides canting of the motor 20 and the cutter head 18 in the plane of travel, resulting in foreshortening of the decline edge portion 25 of the blade 14. This increases the effective angle of cut by the decline blade portion 25. The illustrated angle of cant "A" may lie on either side of the vertical plane.

The blade portions 23, 25 are substantially chisel edged and rotate in a direction so as to cut against the relative direction of travel between the foil 14 and the blade 16.

While traversing means are not illustrated, the provision of a rack secured to the support 24 and meshing with a driven pinion rotatably supported by motor 20 is contemplated. An alternative provision is a tensioned endless chain or cable secured to the motor 20, extending for the length of the structure 24, and driven at a suitable cutter feeding speed to traverse the cutter 16 the full length of the foil 14 in face conditioning relation therewith.

A much smaller installation may be achieved at some possible sacrifice in precise maintenance of accuracy, in an arrangement having the motor mounted in a fixture, with the foil being traversed therepast. Such an arrangement might well be combined with the actual foil mounting in the wet section of the paper machine, possibly by the provision of an extension mount to receive and locate the foil and to position the cutter 16 horizontally relative thereto, whereby on feeding the foil 14 in sliding relation on to its mount against the pre-set rotating blade 16, the mount being equivalent to the top-hat section 19, the desired conditioning of the foil surface is attained.

The subject system makes it possible to operate a paper machine in a mill with the provision of only minimal spare foils. The capability that the system provides of re-profiling a foil or group of foils to any desired angle within the range of the cutter blade and the blade canting adjustment permits ready adjustment or water extraction rates so that initially in setting up the machine wet end, or in making localized adjustments while running to compensate for changes in other factors such as a change in the pulp or furnish, the flexibility of operation thus afforded permits optimized utilization of foils in new and unexpected fashion.

What I claim as new and desire to secure by Letters Patent of the United States is:

1. Surface conditioning apparatus for simultaneously machining two adjacent surfaces lying along mutually inclined planes of a slender water extraction foil having a high ratio of foil length relative to the transverse widths of said surfaces, comprising; surface cutting means to simultaneously machine said two inclined surfaces, said cutting means having a rotatable cutter member including a cutter blade having a pair of cutter edges mutually inclined at an externally measured angle in the range of 181°–185°, one of said edges being substantially parallel with the axis of rotation of said member to machine one of said surfaces and the other of said edges inclined therefrom at said angle to machine the other of said surfaces; driving means to rotatably drive said cutter member in surface machining operation; guide means to permit relative longitudinal displacement between said cutter member and said two surfaces in the direction parallel with the foil longitudinal axis and the line of intersection of said two surfaces, and adjustable mounting means securing said cutter member in adjustable canting relation to change the angle of inclination of the member axis of rotation in a plane parallel with said one of said surfaces to thereby change the line of contact of said other of said cutting edges across said other of said surfaces upon longitudinal displacement along the foil.

2. Apparatus as claimed in claim 1 including a guide structure adjacent said surface cutting means to secure said foil in relative slideable relation therewith.

* * * * *